United States Patent
Sima et al.

(10) Patent No.: US 8,819,099 B2
(45) Date of Patent: Aug. 26, 2014

(54) SOFTWARE IMPLEMENTATION OF MATRIX INVERSION IN A WIRELESS COMMUNICATION SYSTEM

(75) Inventors: Mihai Sima, Victoria (CA); Daniel Iancu, Pleasantville, NY (US); Hua Ye, Durham, NC (US); Mayan Moudgill, White Plains, NY (US)

(73) Assignee: Qualcomm Incorporated, San Diego, CA (US)

( * ) Notice: Subject to any disclaimer, the term of this patent is extended or adjusted under 35 U.S.C. 154(b) by 969 days.

(21) Appl. No.: 12/442,374

(22) PCT Filed: Sep. 24, 2007

(86) PCT No.: PCT/US2007/079305
§ 371 (c)(1),
(2), (4) Date: Nov. 10, 2009

(87) PCT Pub. No.: WO2008/070250
PCT Pub. Date: Jun. 12, 2008

(65) Prior Publication Data
US 2010/0293210 A1 Nov. 18, 2010

Related U.S. Application Data

(60) Provisional application No. 60/827,002, filed on Sep. 26, 2006.

(51) Int. Cl.
*G06F 7/32* (2006.01)
(52) U.S. Cl.
USPC ............ 708/520; 708/200; 708/209; 708/270
(58) Field of Classification Search
None
See application file for complete search history.

(56) References Cited

U.S. PATENT DOCUMENTS

| | | | |
|---|---|---|---|
| 4,950,042 A | 8/1990 | Gaylor et al. | |
| 5,737,277 A | 4/1998 | Priest | |
| 6,076,154 A * | 6/2000 | Van Eijndhoven et al. | 712/24 |
| 6,842,848 B2 | 1/2005 | Hokenek et al. | |
| 6,904,511 B2 | 6/2005 | Hokenek et al. | |
| 6,912,623 B2 | 6/2005 | Hokenek et al. | |
| 6,925,643 B2 | 8/2005 | Hokenek et al. | |
| 6,968,445 B2 | 11/2005 | Hokenek et al. | |
| 6,971,103 B2 | 11/2005 | Hokenek et al. | |
| 6,990,557 B2 | 1/2006 | Hokenek et al. | |
| 7,251,737 B2 | 7/2007 | Weinberger et al. | |
| 7,428,567 B2 | 9/2008 | Schulte et al. | |
| 7,475,222 B2 | 1/2009 | Glossner et al. | |
| 7,593,978 B2 | 9/2009 | Schulte et al. | |
| 7,685,219 B2 * | 3/2010 | Li | 708/400 |

(Continued)

OTHER PUBLICATIONS

Notification of Transmittal of the International Search Report and the Written Opinion of the International Search Authority, or the Declaration, May 19, 2008.

(Continued)

*Primary Examiner* — Michael D Yaary
(74) *Attorney, Agent, or Firm* — Knobbe Martens Olson & Bear LLP

(57) ABSTRACT

A digital signal processor is provided in a wireless communication device, wherein the processor comprises a vector unit, first and second registers coupled to and accessible by the vector unit; and an instruction set configured to perform matrix inversion of a matrix of channel values by coordinate rotation digital computer instructions using the vector unit and the first and second registers.

11 Claims, 12 Drawing Sheets

(56) References Cited

U.S. PATENT DOCUMENTS

| | | | |
|---|---|---|---|
| 7,797,363 | B2 | 9/2010 | Hokenek et al. |
| 2003/0231702 | A1 | 12/2003 | Oates et al. |
| 2004/0196065 | A1* | 10/2004 | Madurawe ................. 326/41 |
| 2005/0195733 | A1 | 9/2005 | Walton et al. |
| 2006/0095729 | A1 | 5/2006 | Hokenek et al. |
| 2009/0276432 | A1 | 11/2009 | Hokenek et al. |
| 2010/0122068 | A1 | 5/2010 | Hokenek et al. |
| 2010/0199073 | A1 | 8/2010 | Hokenek et al. |
| 2010/0199075 | A1 | 8/2010 | Hokenek et al. |

OTHER PUBLICATIONS

Balzola et al., Sep. 26, 2001, Design alternatives for parallel saturating multioperand adders, Proceedings 2001 International Conference on Computer Design, pp. 172-177.
Balzola, Apr. 2003, Saturating arithmetic for digital signal processors, PhD Thesis, Lehigh University.
Glossner et al, 2000, Trends in compilable DSP architecture, IEEE Workshop in Signal Processing Systems, pp. 1-19.
Glossner et al., Apr. 2001, Towards a very high bandwidth wireless battery powered device, IEEE Computer Society Workshop in VLSI, pp. 3-9.
Glossner et al., Nov. 2002, A multithreaded processor architecture for SDR, The Proceedings of the Korean Institute of Communication Sciences, 19(11):70-84.
Glossner et al., Nov. 11-12, 2002, Multi-threaded processor for software-defined radio, Proceedings of the 2002 Software Defined Radio Technical Conference, vol. 1, 6 pp.
Glossner et al., Jan. 2003, A software defined communications baseband design, IEEE Communications Magazine, 41(1):120-128.
Glossner et al., Sep. 22, 23, 2003, Multiple communication protocols for software defined radio, IEEE Colloquium on DSP Enable Radio, ISIL, Livingston, Scotland, pp. 227-236.
Glossner et al., Mar. 4, 2004, 6. The Sandbridge sandblaster communications processor, Software Defined Radio: Baseband Technologies for 3G Handsets and Basestations, John Wiley & Sons, Ltd., pp. 129-159.
Jinturkar et al., Mar. 31-Apr. 3, 2003, Programming the Sandbridge multithreaded processor, Proceedings of the 2003 Global Signal Processing Expo (GSPx) and International Signal Processing Conference (ISPC), Dallas, Tx.
Schulte et al., Nov. 19, 2000, Parallel saturating multioperand adders, Cases '00, pp. 172-179.
Schulte et al., Nov. 2004, A low-power multithreaded processor for baseband communication systems, Lecture Notes in Computer Science, 3133:393-402.
ISR and WO dated May 19, 2008 in PCT/US07/79305.
IPRP dated Mar. 31, 2009 in PCT/US07/79305.
Charlier et al., May 1988, On Efficient Implementations on Kogbeliantz's Algorithm for Computing the Singular Value Decomposition, Numerische Mathematik, 52(3):279-300.
Coleman et al., 1988, Handbook for Matrix Computations, Society for Industrial and Applied Mathematics (SIAM), Philadelphia, Pa., 4 pp.
Francis, Jan. 1962, The QR transformation—Part 2, The Computer Journal, 4(4):332-345.
Francis, Oct. 1961, The QR decomposition transformation—Part 1, The Computer Journal, 4(3):265-272.
Gentleman et al., Jan. 1981, Matrix Triangularization by Systolic Arrays, Proceedings of the International Society for Optical Engineering (SPIE), 298:19-26.
Gesbert et al., Apr. 2003, From theory to practice: an overview of MIMO space-time coded wireless systems, IEEE Journal on Selected Areas in Communications, 21(3):281-302.
Glossner et al., Sep. 2004, Sandblaster Low-Power Multithreaded SDR Baseband Processor, Proceedings of the 3rd Workshop on Applications Specific Processors (WASP'04), Stockholm, Sweden, pp. 53-58.
Golub et al., Dec. 21, 1998, Matrix factorizations on fixed point on the C6x VLIW architecture, TI Report.
Horn et al., 1985, Matrix Analysis, Cambridge University Press, 40 West 20th Street, New York, N.Y. 10011-4211, U.S.A.
Kublanoyskaya, Mar. 1961, On some algorithms for the solution of the complete eigen value problem, USSR Comput. Math. and Math. Physics, 1(4):637-657.
Meyer, 2000, Matrix Analysis and Applied Linear Algebra, Society for Industrial and Applied Mathematics (SIAM), Philadelphia, Pa., 5 pp.
Perels, Sep. 2005, ASIC Implementation of a MIMO-OFDM Transceiver for 192 Mbps WLANs, European Solid-State Circuits Conference (ESSCIRC 05), pp. 215-218.
Salminen et al., Jul. 2004, HIBI v.2 communication network for system-on-chip, SAMOS 2004, LNCS 3133, pp. 393-402.
Sima et al., 2005, CORDIC—Augmented Sandbridge Processor for Channel Equalization, Embedded Computer Systems: Architectures, Modeling, and Simulation (SAMOS 2005), Lecture Notes in Computer Science.(LNCS) 3553:152-161.
Trefethen et al., 1997, Numerical Linear Algebra, Society for Industrial and Applied Mathematics (SIAM), Philadelphia, Pa., 3 pp.
Volder, Sep. 1959, The CORDIC trigonometric computing technique, IRE Transactions on Electronic Computers, EC-8(3):330-334.
Walther, 1971, A unified algorithm for elementary functions, Proceedings of the Spring Joint Computer Conference of the American Federation of Information Processing Societies (AFIPS), 38:379-385.

\* cited by examiner

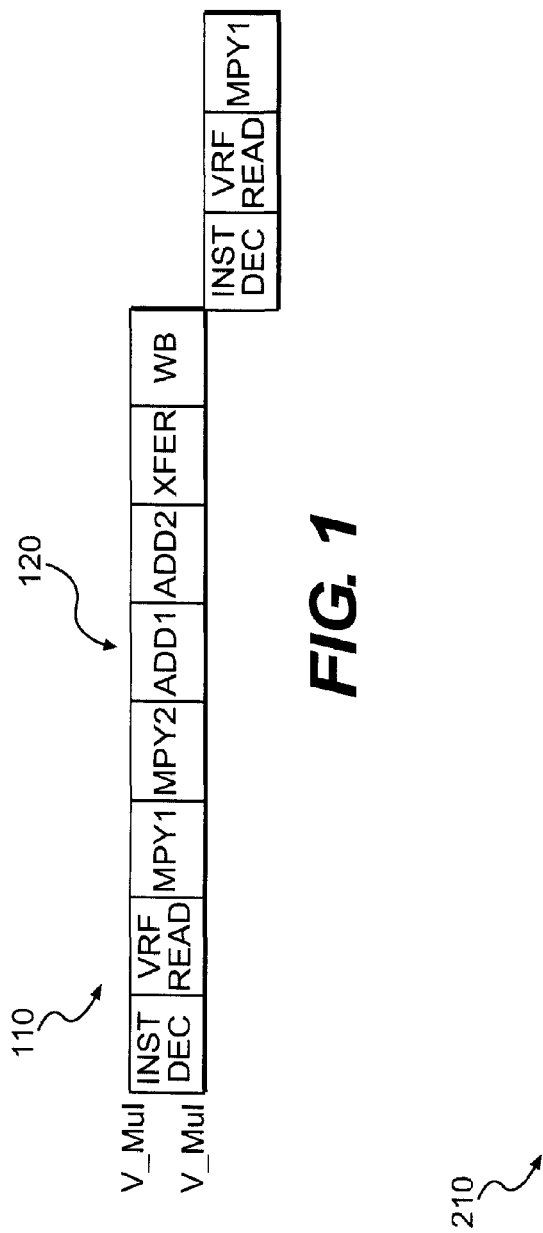

SOFTWARE IMPLEMENTATION OF MATRIX INVERSION IN A WIRELESS COMMUNICATION SYSTEM

FIELD OF THE INVENTION

The present invention relates generally to wireless communication systems and more specifically to a software implementation of matrix inversion in a wireless communication system.

BACKGROUND OF THE INVENTION

Communication frequency spectrum is often scarce with precious little available for future technologies. Most of the world's available frequency bands have already been allocated to specific services. What remains is auctioned by government agencies typically for billions of dollars.

From a mobile operator's perspective, effective delivery of services to customers is dependent upon maximizing both network capacity and coverage. Network capacity is improved by enabling more non-interfering users within a base station cell or providing higher bandwidth to users within range of a base station. Thus, each new generation of communications systems design attempts to provide additional capacity based on technological advances in the field.

Nevertheless, high data-rate wireless access is demanded by many applications. Traditionally, more bandwidth is required for higher data-rate transmission. However, due to spectral limitations, it is often impractical or sometimes very expensive to increase bandwidth. In such cases, Multiple-Input Multiple-Output (MIMO) systems using multiple transmit and receive antennae provide an alternative solution (See, David Gesbert, Mansoor Shan, Da shan Shiu, Peter J. Smith, and Ayman Naguib, "From Theory to Practice: an Overview of MIMO Space-Time Coded Wireless Systems," *IEEE Journal on Selected Areas in Communications*, vol. 21, no. 3, pp. 281-302, April 2003). In particular, Orthogonal Frequency Division Multiplexing (OFDM) can be used in conjunction with MIMO (See, Richard D. J. van Nee and Ramjee Prasad, Eds., *OFDM for Wireless Multimedia Communications*, Artech House Publishers. Norwood, Mass. 02062, U.S.A., 2000). A MIMO-OFDM system can significantly improve the link reliability and throughput of wireless communication systems (See, Helmut Bolcskei, *Principles of MIMO-OFDM Wireless Systems*, 2004. David Perels, Simon Haene, Peter Luethi, Andreas Burg, Norbert Felber, Wolfgang Fichtner, and Helmut Bolcskei, "ASIC Implementation of a MIMO-OFDM Transceiver for 192 Mbps WLANs," *European Solid-State Circuits Conference (ESSCIRC* 05), pp. 215-218, September 2005). These gains come at no additional transmit power or bandwidth expenditure.

However, one of the main obstacles in implementing MIMO-OFDM is the extremely high computational requirements. For this reason, software implementation within the terminal stations is very difficult to achieve and only custom hardware solutions are conventionally available (See, John C. Glossner, Erdem Hokenek, and Mayan Moudgill, "Multi-threaded Processor for Software Defined Radio," *Proceedings of the 2002 Software Defined Radio Technical C*" San Diego, Calif., November 2002, vol. 1, pp. 195-199).

SUMMARY

Currently, for Time-Division Duplex (TDD) modes of operation where the channel is symmetrical, the central access points, e.g., base stations, run complex DSP algorithms. In the Frequency-Division Duplex (FDD) mode, the channel is not symmetrical; consequently, the terminal station needs to do at least some part of the work.

Thus, in accordance with at least one embodiment of the invention a digital signal processor is provided in a wireless communication device, wherein the processor comprises a vector unit, first and second registers coupled to and accessible by the vector unit; and an instruction set configured to perform matrix inversion of a matrix of channel values by coordinate rotation digital computer instructions using the vector unit and the first and second registers.

Further, in accordance with at least one embodiment of the invention, both central and terminal stations are tasked equally for matrix inversion in a wireless communication system. Further, in accordance with at least one embodiment of the invention, complex matrix operations specific to MIMO-OFDM are executed in software. A COordinate Rotation DIgital Computer (CORDIC)-based approach may be utilized that enables complex matrix operations such as QR decomposition, eigenvalue decomposition, and singular-value decomposition to be executed efficiently in software on a multithreaded Single-Instruction Multiple-Data (SIMD) processor. Additionally, triangularization may be performed in an SIMD style on a multi-threading processor and QR decomposition via a software implementation may be performed using Givens rotation method.

BRIEF DESCRIPTION OF THE DRAWINGS

FIG. 1 is a diagram of two consecutive Vector Multiplication instructions that issue from the same thread in accordance with at least one embodiment of the invention.

FIG. 2 is a diagram of the pipelining of a processor used in conjunction with or incorporating functionality provided in accordance with at least one embodiment of the invention.

DETAILED DESCRIPTION OF EMBODIMENTS

Figure 3:
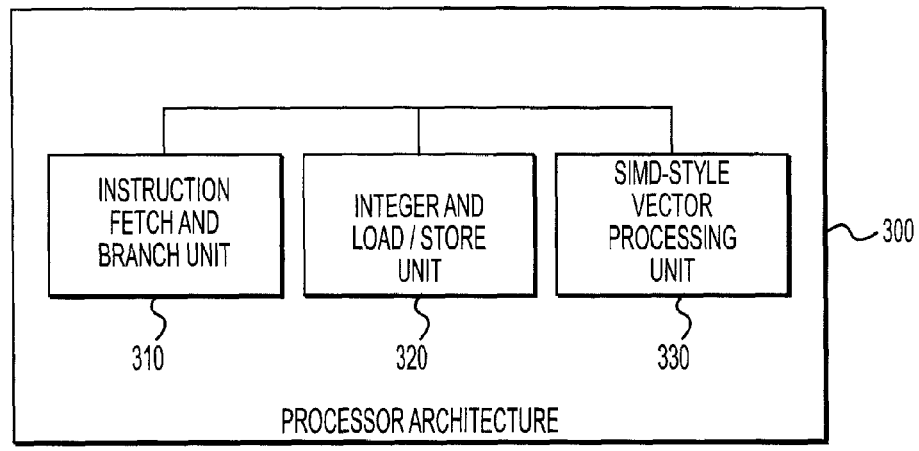
FIG. 3 is a functional block diagram of a processor architecture utilized in conjunction with or incorporating the functionality provided in accordance with at least one embodiment of the invention.

A MIMO communication system includes a generic multiple antenna communication system contains M transmitting antennae and N receiving antennae. Each receiving antenna is able to receive information from each of the transmitting antennae. Therefore, there are M×N signal paths from transmitter to receiver. Each transmitting antenna may or may not broadcast the same information.

Assuming that H denotes the channel matrix. Then, the element $h_{ij}$ is a complex number that models fading gain between the $i^{th}$ transmit and the $j^{th}$ receive antenna. As a result, the channel matrix may be estimated through a training process. A pseudorandom sequence may be assigned to each transmitting antenna. Subsequently, each of the receiving antennas may be able to separate incoming signals through a correlative analysis. Assuming that the transmitted signal is OFDM, a certain number of carriers may be pilots. Each pilot may carry known complex information in a specified constellation. During propagation, the channel may act on the carriers adding errors. Assuming that the frequency spacing between the carriers is small enough to assure flat frequency fading for each carrier on the per carrier allocated bandwidth, then the communication channel parameters specific to one of the pilots from a specific antenna can be estimated through a complex division (See, van Nee et al., supra).

Further, assuming that the transmitted signal vector is X, and the noise vector is N, then the received signal vector Y may be given by:

$$Y = HX + N \quad (1)$$

Through eigenvalue and singular-value decompositions, a MIMO channel can then be transformed into multiple, independent SISO channels. The channel matrix, H, may have a singular value decomposition $H = U\Lambda V^H$, where $\Lambda$ is an upper diagonal matrix of singular values of H, and U and $V^H$ are unitary matrices of singular vectors. Thus, if the transmitted signal is multiplied by V, and the received signal is multiplied by $U^H$, then:

$$\tilde{Y} = \Lambda \tilde{X} + \tilde{N} \quad (2)$$

where $\tilde{Y} = U^H Y$, $\tilde{X} = VX$, $\tilde{N} = U^H N$.

Equation (2) describes an equivalent model for multiple independent SISO channels. Once the channel matrix, H, can be estimated, the corresponding singular-value decomposition can also be calculated. Then, the matrix V may be transmitted back to the transmitter, which in turn pre-distorts the signal prior to transmission. Accordingly, the received OFDM signals may now be independent and be decoded in parallel on multiprocessor systems (See, Michael J. Schulte, John C. Glossner, Suman Mamidi, Mayan Moudgill, and Stamatis Vassiliadis, "A Low-Power Multithreaded Processor for Baseband Communication Systems," in *Proceedings of the Third and Fourth International Annual Workshops on Systems, Architectures, Modeling, and Simulation (SAMOS)*; Andy D. Pimentel and Stamatis Vassiliadis, Eds., Samos, Greece, July 2004, vol. 3133 of *Lecture Notes in Computer Science*, pp. 393-402, Springer; John C. Glossner, Michael J. Schulte, Mayan Moudgill, Daniel Iancu. Sanjay Jinturkar, Tanuj Raja, Gary Nacer; and Stamatis Vassiliadis, "Sandblaster Low-Power Multithreaded SDR Baseband Processor," *Proceedings of the 3rd Workshop on Applications Specific Processors (WASP '04)*, Stockholm, Sweden, September 2004, pp. 53-58; and Roger A. Horn and Charles R. Johnson, *Matrix Analysis*, Cambridge University Press, 40 West 20th Street, New York, N.Y. 10011-4211, U.S.A., 1985).

As a consequence of the capability to perform parallel decoding on multiprocessor systems, performing eigenvalue decomposition and/or singular-value decomposition of complex matrices efficiently is of increased importance. Further, the QR decomposition is an important step in solving these decompositions as well as many other linear algebra problems in real-time. Thus, the QR decomposition will now be described. The QR decomposition of a matrix $A \in C^{m \times n}$ is given by $$A = Q \begin{pmatrix} R \\ 0 \end{pmatrix} \quad (3)$$

where the matrix $Q \in C^{m \times n}$ is unitary, the matrix $R \in C^{m \times n}$ is the upper triangular, and 0 is an (m−n)-by-n all-zero matrix. If the matrix A is non-singular (that is, square and has full rank), then the diagonal elements of R can be chosen real and positive, and in this event, the factors Q and R are both unique (See, Lloyd N. Trefethen and David Bau, III, *Numerical Linear Algebra*, Society for Industrial and Applied Mathematics (SIAM), Philadelphia, Pa., 1997; and Vera N. Kublanovskaya, "On some algorithms for the solution of the complete eigenvalue problem," *USSR Comput. Math. and Math. Physics*, vol. no. 3, pp. 637-657, March, 1961). If the matrix A is singular or is not square (for example, m>n), then the factorization is not unique (e.g., some of the ortho-normal columns of Q are introduced arbitrary).

Many ideas of linear algebra rely on the QR decomposition. For example, the QR factorization provides an iterative procedure for approximating the eigenvalues of a diagonalizable non-symmetric matrix (See, J. G. F. Francis, "The QR decomposition transformation—Part 1," *The Computer Journal*, vol. 4, no. 3, pp. 265-272, October 1961; and J. G. F. Francis, "The QR transformation—Part 2," *The Computer Journal*, vol. 4, no. 4, pp. 332-345, January 1962; and J. P. Charlier, M. Vanbegin, and P. Van Dooren, "On Efficient Implementations on Kogbeliantz's Algorithm for Computing the Singular Value Decomposition," *Numerische Mathematik*, vol. 52, no. 3, pp. 279-300, May 1988). Equally important, once the triangular form R has been obtained, its diagonal elements can be chosen with real diagonal elements (See Trefethen et al., supra and Kublanovskaya, supra). Then, the singular-value decomposition can be much easier performed starting from this triangular matrix with real diagonal elements (See, Carl D. Meyer, *Matrix Analysis and Applied Linear Algebra*, Society for Industrial and Applied Mathematics (SIAM), Philadelphia, Pa., 2000).

However, as is conventionally understood QR decomposition is computationally expensive. Algorithms for performing QR decomposition, typically require 0 ($n^3$) operations on general n by n matrices (See, Kublanovskaya, supra; Morven W. Gentleman and Hsiang-Tsung Kung, "Matrix Triangularization By Systolic Arrays," in *Proceedings of the International Society for Optical Engineering (SPIE), Real-Time Signal Processing IV*, 1000 20th Street, Bellingham, Wash. 98225-6705, U.S.A., January 1981, vol. 298, pp. 19-26, SPIE Press). To perform triangularization in a time-effective way, systolic arrays have been proposed (See, for example, Thomas F. Coleman and Charles F. van Loan, *Handbook for Matrix Computations*, Society for Industrial and Applied Mathematics (SIAM), Philadelphia, Pa., 1988).

As explained above, in accordance with at least one embodiment of the invention, both central and terminal stations are tasked equally in a MIMO-OFDM implementation. Further, in accordance with at least one embodiment of the invention, complex matrix operations specific to MIMO-OFDM may be executed in software.

QR decomposition (also called the QR factorization) is a preliminary task for eigenvalue and singular-value decomposition. The Givens rotation method may be the most appropriate technique to perform QR factorization on various communication architectures (See, e.g., Schulte et al., supra; Pimentel et al, supra; Glossner et al., supra; and Stamatis Vassiliadis, "Sandblaster Low-Power Multithreaded SDR Baseband Processor," in *Proceedings of the 3rd Workshop on Applications Specific Processors (WASP '04)*, Stockholm, Sweden, September 2004, pp. 53-58; and Horn et al., supra).

However, the Givens rotation is computationally demanding and intensively used in many complex matrix operations. Thus, in accordance with at least one embodiment of the invention, the Givens rotation is given architectural support by a CORDIC functional unit and associated instructions.

A CORDIC unit utilizes a simple and efficient algorithm to calculate hyperbolic and trigonometric functions. A CORDIC approach is commonly used when no hardware multiplier is available (e.g., simple microcontrollers and Flip Chip Pin Grind Arrays (FCPGAs)) as the only operations it requires are addition, subtraction, bitshift and table lookup. CORDIC is generally faster than other approaches when a hardware multiplier is unavailable (e.g., in a microcontroller), or when the number of gates required to implement one needs to be minimized (e.g. in an FPGA). Accordingly, implementing a CORDIC-augmented processor enables faster speeds than more standard processors. Given the fact that conventional processors are implemented as single instruction multiple data-very long instruction word (SIMD-VLIW) processors with powerful DSP instruction sets, such an improvement within a target processing domain indicates that CORDIC-augmented processors are a promising approach.

However, no conventionally known pure-software solutions for effectively implementing MIMO-OFDM exist. Thus, in accordance with at least one embodiment of the invention, a novel CORDIC-based approach is provided that enables complex matrix operations such as QR decomposition, eigenvalue decomposition, and singular-value decomposition to be executed efficiently in software on a multi-threaded Single-Instruction Multiple-Data (SIMD) processor.

As a result, in accordance with at least one embodiment of the invention, the Givens rotation technique may be used to perform QR decomposition, eigenvalue decomposition, and singular value decomposition in software on a multithread processor.

Further, in accordance with at least one embodiment of the invention, a CORDIC functional unit may be incorporated into conventionally known processor architecture to provide FULL-CORDIC and/or SEMI-CORDIC operations including performing QR decomposition, eigenvalue decomposition, and singular value decomposition.

Thus, in accordance with at least one embodiment of the invention, a single instruction multiple data digital signal processor may be provided in a wireless communication device including a vector unit, first and second registers and instruction set, wherein the instruction set performs matrix inversion of a matrix of channel values by coordinate rotation digital computer instructions using the vector unit and the first and second registers.

The instructions may read x and y coordinates, angle z and iteration count n from the first and second registers. Further, the instructions may perform four additions and four shifts during four executions and write the resulting x and y coordinates, angle z and iteration count n into the first and second registers. Additionally, the instructions may have a rotation mode; the first register may include x and y coordinates and the second register may include the angle z and the iteration count n. The instructions may further have a vector mode and the first register may include the x coordinate and the angle z and the second register may include the y coordinate and the iteration count n.

The instructions may perform a Givens rotation of the matrix. The signal processor may be a multi-thread, very long word instruction processor; thus, the instructions may use multi-threading.

The matrix channel values may be MIMO received values to be converted to SISO values for further processing by the instructions.

In accordance with at least one embodiment of the invention, the first and second registers may be implemented in a register file.

In such an implementation, the instructions for a single operation may include sequential steps wherein the first and second registers are read, the coordinate rotation digital computer process is performed and the results are written in the first register. Alternatively, instructions for a single operation may include sequential steps wherein the first and second registers are read, the coordinate rotation digital computer process is performed and the results are written in the second register. Further, for a rotation mode, instructions may first read the first and second registers, perform the coordinate rotation digital computer process and write the results in the first register. Alternatively, for a vector mode of the coordinate rotation digital computer process, the instructions may first read the first and second registers, perform the coordinate rotation digital computer process and write the results in the second register.

In accordance with at least one embodiment of the invention, the first register may be implemented in a register file and the second register may be implemented in the vector unit. In such an implementation, the instructions may read the first and second registers, perform the coordinate rotation digital computer process and write the results in the first and second registers.

In accordance with at least one embodiment, triangularization may be performed in an SIMD style on a multi-threading processor. Accordingly, parallel algorithms may be used in conjunction with the invention. In accordance with at least one embodiment of the invention, QR decomposition via software implementation may be performed using a Givens rotation method.

A complex Givens rotation can be described in terms of two rotation angles (Jack E. Voider, "The CORDIC trigonometric computing technique," *IRE Transactions on Electronic Computers*, vol. EC-8, no. 3, pp. 330-334, September 1959):

$$\begin{pmatrix} \cos\theta_1 & \sin\theta_1 e^{j\theta_2} \\ -e^{-j\theta_2}\sin\theta_1 & \cos\theta_1 \end{pmatrix} \cdot \begin{pmatrix} a_{re} + ja_{im} \\ b_{re} + jb_{im} \end{pmatrix} = \begin{pmatrix} r_{re} + j\, r_{im} \\ 0 \end{pmatrix} \quad (4)$$

where the rotation matrix can be decomposed into:

$$\begin{pmatrix} e^{j\alpha_a} & 0 \\ 0 & e^{j\alpha_b} \end{pmatrix} \cdot \begin{pmatrix} \cos\theta_1 & \sin\theta_1 \\ -\sin\theta_1 & \cos\theta_1 \end{pmatrix} \cdot \begin{pmatrix} e^{-j\alpha_a} & 0 \\ 0 & e^{-j\alpha_b} \end{pmatrix} \quad (5)$$

where the complex numbers a and b can be written in either Cartesian or Polar coordinate systems: $a=a_{re}+j\ a_{im}=\rho_a e^{j\alpha_a}$, $b=bre+j^b im=\rho_a e^{j\alpha_b}$. The angle $\theta_2=\alpha_a-\alpha_b$.

It should be noted that the last rotation by the angle $-\alpha_b$ is in fact no rotation, since $e^{-j\alpha_b}b$ is multiplied by zero. Consequently, only four rotation angles are needed to describe the complex Given rotation: $\alpha_a$, $\alpha_b$, $\theta_1$, and $-\alpha_a$. If $\theta_2=0$, then the transformation describes a real Givens rotation:

$$G(\theta_1, 0) = \begin{pmatrix} \cos\theta_1 & \sin\theta_1 \\ -\sin\theta_1 & \cos\theta_1 \end{pmatrix} \quad (6)$$

As noted above, the Givens transformation can be computationally demanding. For example, only the direct evaluation of the real rotation requires four multiplications, two additions, and a large memory storing the cosine and sine tables. Also, finding the angle $\theta_1$ translates to a sequence of multiplications, additions, and memory look-up operations if, for example, Taylor series expansion is employed. Therefore, while a desktop computer may have sufficient hardware recourses to support these operations, implementing the Givens rotation on an embedded platform for wireless applications can be problematic. Therefore, in accordance with at least one embodiment of the invention, a CORDIC may be used to provide an iterative method for performing vector rotations by arbitrary angles using only shifts and additions, as should be apparent in Equations 7 and 8 presented below.

Since the CORDIC theory is well known, it is not described in further detail (however, see, J. S. Walther, "A unified algorithm for elementary functions," in *Proceedings of the Spring Joint Computer Conference of the American Federation of Information Processing Societies (AFIPS)*, Arlington, Va., 1971, vol. 38, pp. 379-385, AFIPS Press; and Julien Sebot and Nathalie Drach, "SIMD ISA Extensions: Reducing Power Consumption on a Superscalar Processor for Multimedia Applications," in *IEEE Symposium on Low-Power and High-Speed Chips (Cool Chips)* IV, Tokyo, Japan, April 2001).

A CORDIC rotator may be operated in one of two modes: rotation or vectoring. In rotation mode, the angle accumulator may be initialized with the desired rotation angle. The rotation decision at each iteration may be made to diminish the magnitude of the residual angle in the angle accumulator, as follows.

$$\begin{cases} x[i+1] = x[i] - m\sigma[i]2^{-i}y[i] \\ y[i+1] = y[i] + \sigma[i]2^{-i}x[i] \\ z[i+1] = z[i] - \sigma[i]\arctan(2^{-i}) \\ i = i+1 \end{cases} \quad (7)$$

$$\text{where } \sigma[i] = \begin{cases} +1 & \text{if } z[i] \geq 0, \\ -1 & \text{otherwise.} \end{cases}$$

In vectoring mode, the CORDIC unit may rotate the input vector through various angles necessary to align the result vector with the x-axis. The result of the vectoring operation may be a rotation angle and the scaled magnitude of the original vector (i.e., the x-component of the result).

$$\begin{cases} x[i+1] = x[i] - m\sigma[i]2^{-i}y[i] \\ y[i+1] = y[i] + \sigma[i]2^{-i}x[i] \\ z[i+1] = z[i] - \sigma[i]\arctan(2^{-i}) \\ i = i+1 \end{cases} \quad (8)$$

$$\text{where } \sigma[i] = \begin{cases} +1 & \text{if } y[i] \geq 0, \\ -1 & \text{otherwise.} \end{cases}$$

Using CORDIC, transcendental functions can be calculated with the latency of a serial multiplication. By providing an additional parameter, the CORDIC method can be generalized to perform rotations in a linear or hyperbolic coordinate system (Id.). This results in a more powerful tool for function evaluation. In addition, the CORDIC algorithm may produce one bit of accuracy for each iteration. Thus, the accuracy may be adjusted at run time. This behavior is in contrast to Multiply/ACcumulate (MAC) units, where the word length, and, thus, the accuracy, must be decided at manufacturing time.

Assuming that 16-bit precision may be needed (which is usually the case in OFDM demodulation), then the CORDIC algorithm may read in two 16-bit arguments and produce two 16-bit results.

Multithreaded processors are available that are capable of executing digital-signal processing or SIMD vector processing, embedded control, and Java code in a single compound instruction set optimized for handset radio applications (See, Schulte et al., supra; Pimentel et al. supra; Glossner et al., supra; and Horn et al., supra).

Accordingly, up to eight concurrent threads may be supported in hardware. Further, multiple copies (e.g., banks and/or modules) of memory may be available for each thread to access. As illustrated in FIG. 1, each thread (V-Mul) 110 may be allowed to simultaneously execute an instruction 120 (e.g., VRF Read, Mpy1, Mpy2, etc.), but only one thread may issue an instruction on a cycle boundary, as depicted in FIG. 1. In this way, all the operations may have the same latency. Therefore, true dependencies, which typically occur in connection with long-latency operations, may be effectively hidden.

Further, as illustrated in FIG. 2, pipelines 210 may be different for various operations as shown in FIG. 2. For example, the Load/Store (Ld/St) pipeline 210 may have, for example, nine stages 220. The integer and load/store unit may have two execute stages for the instructions for the Arithmetic and Logic Unit (ALU) pipeline 210 and three execute stages for the instructions for the Integer MULtiplication (I_MUL) pipeline 210. A Wait stage for the ALU and I_MUL pipeline instructions may cause these instructions to be read from a general-purpose register file one cycle later than Ld/St pipeline instructions, which may help to reduce the number of register file read ports. The vector multiplication (V_MUL) pipeline 210 may have four execute stages 220—two for multiplication and two for addition. It should be noted that once an instruction from a particular thread enters a pipeline, it may run to completion. It may also be guaranteed to write back result of the thread before the next instruction from the same thread reads the result.

As illustrated in FIG. 3, a processor architecture 300 used in conjunction with at least one embodiment of the invention may be partitioned into three units: an instruction fetch and branch unit 310, an integer and load/store unit 320, and a SIMD-style Vector Processing Unit (VPU) 330. The instructions to speed up CORDIC operations may be executed in the SIMD-style vector unit 330.

Figure 4:
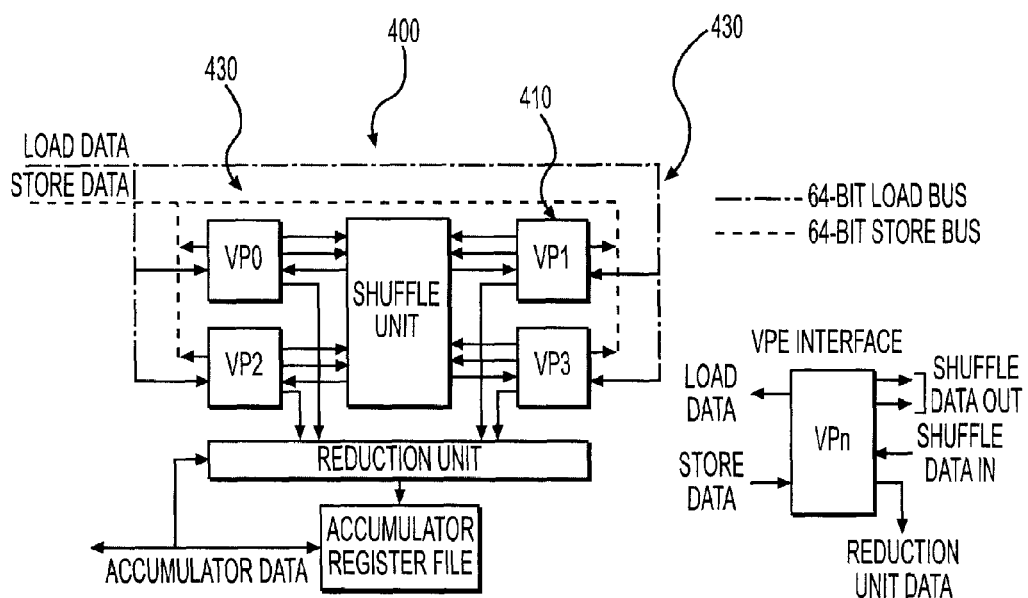
FIG. 4 is a schematic one example of a Vector Processing Unit (VPU) of a processor architecture used in conjunction with or incorporating functionality provided in accordance with at least one embodiment of the invention.

As illustrated in FIG. 4, the VPU 330 may include, for example, four Vector Processing Elements 410 (VPEs) VP0-VP4, which may be configured to perform arithmetic and logic operations in SIMD fashion on 16-bit, 32-bit, and 40-bit fixed-point data types. High-speed 64-bit data busses 420 may allow each PE to load or store 16 bits of data each cycle in SIMD fashion. Support for SIMD execution may significantly reduce code size, as well as power consumption, since multiple sets of data elements may be processed with a single instruction (See, Mihai Sima, John Glossner, Daniel Iancu, Hua Ye, Andrei Iancu, and Jr. A. Joseph Doane, "CORDIC-Augmented Sandbridge Processor for Channel Equalization," in *Proceedings of the 5th Workshop on Embedded Computer Systems.—Architectures, MOdeling, and Simulation* (*SAMOS* 2005); and Timo D. Hamfildinen, Andy D. Pimentel, Jarmo Takala, and Stamatis Vassiliadis, Eds., Samos, Greece, July 2005, vol. 3553 of *Lecture Notes in Computer Science* (*LNCS*), pp. 152-161, Springer-Verlag).

Most SIMD vector instructions may go through eight pipeline stages. For example, a vector MAC (V_MAC) instruction goes through the following stages: Instruction Decode, Vector Register File (VRF) Read, Mpy1, Mpy2, Add1, Add2, Transfer, and Write Back. The Transfer stage is needed due to the long wiring delay between the bottom of the VPU and the VRF. Since there are eight cycles between when consecutive instructions issue from the same thread, results from one instruction in a thread are guaranteed to have written their results back to the VRF by the time the next instruction in the same thread is ready to read them. Thus, the long pipeline latency of the VPEs is effectively hidden, and no data dependency checking or bypass hardware may be needed. This is illustrated in FIG. 1, where two consecutive vector multiply instructions 120 may issue from the same thread. Even if there is a data dependency between the two instructions 120, there is no need to stall the second instruction 120 because the first instruction 120 has completed the Write Back stage before the second instruction 120 enters the VRF Read stage.

In conventional general-purpose machines, where only standard arithmetic operations are supported in hardware, the Givens rotation method is more computationally intensive than, for example, either a Gram-Schmidt orthogonalization method or a Householder reflection method (See, Morven et al., supra). However, when certain computing primitives are implemented in hardware rather than in software, the computing complexity of different decomposition methods may change. For example, when a CORDIC algorithm is implemented in a hardware assist, then a plane rotation may be performed in no more time than a bit serial multiplication. Hence, when elementary operations are counted (an elementary operation being a multiply-and add, CORDIC, or other operation supported in hardware), the Givens-rotation method may become an attractive alternative.

Like Givens rotations, and also Householder reflections, are numerically stable algorithms for calculating the QR decomposition. Both techniques provide ways to easily compute unitary matrices called Givens rotations and Householder reflections, which can introduce zeros into vectors that they multiply. Givens rotations may be used to reduce a matrix to triagonal form (See, U.S. Pat. No. 6,076,154, issued to Jos T. J. van Eijndhoven, Gerrit A. Slavenburg, and Selliah Rathnam, and entitled "VLIW Processor has Different Functional Units Operating On Commands of Different Widths"). The rotation angles may be chosen to annihilate the off-diagonal elements one-by-one. The rotations are chosen in a particular order; this sequence is such that an element reduced to zero by a rotation may never become non-zero in a later transformation.

One example of this precise ordering of rotations is as follows. Starting with the first column, elements in positions (2, 1) to (n,1) may be annihilated. Subsequently, the second column is processed and elements in positions (3,2) to (n, 2) are annihilated, and so on. As a result, it may be readily verified that a zero introduced by one transformation is not affected by subsequent transformation.

To the contrary, according to Householder reflections, a succession of elementary unitary matrices $Q_k$ may be applied on the left of A such that the resulting matrix H $$\underbrace{Q_n \ldots Q_2 Q_1}_{Q^*} A = R \tag{9}$$

is upper-triangular. The product $Q=Q_1^* Q_2^* \ldots Q_n^*$ is unitary, as well. Therefore, the product QR is a QR factorization of matrix A. Householder proposed a way to design the unitary matrices $Q_k$ so that at each step k, all the elements of the k-th column, x, that are below the main diagonal are zeroed by multiplication on the left by matrix $Q_k$ (See U.S. Pat. No. 6,076,154 and Kublanovskaya, supra). This is illustrated in Equation 10.

$$Q_k x = \|x\| e_1 \tag{10}$$

where $e_1$ is a canonical unit vector. The reflector $Q_k$ (which is a matrix of full rank and unitary) is given by:

$$Q_k = I - 2 \frac{vv^*}{v^*v} \tag{11}$$

where $v = \|x\| e_1 - x$.

(See, Kublanovskaya, supra).

Conventional literature reports that the computational effort in the Householder method is slightly lower that in the Givens method, while both methods are numerically stable. Implementation of the Householder method may have increased utility in an implementation on a general-purpose computing platform. However, in the Householder method, it can be easily observed that the size of the reflector $Q_k$ is decremented each iteration. In some implementations, this dynamic change may not be acceptable in deployed hardware.

To the contrary, if the implementation architecture includes SIMD, VLIW, and multi-threading capabilities, there are many issues that enable the Givens rotation method to provide increased utility. Generally speaking, programs that exhibit a high level of parallelism and symmetry of computation can benefit most by such specialized architecture. Further, the Givens method exhibits a regular computation pattern. For example, in comparison with the Householder method, the Givens method introduces only a single zero per matrix multiplication. In addition to the computation pattern issue, Givens rotation may also be readily supported in a CORDIC-extended processor implementation.

However, it should be appreciated that a Givens rotation implementation may be more expensive in terms of operation count than the Householder method implementation. Therefore, in accordance with at least one embodiment of the invention, the Householder method may be used to perform QR decomposition, eigenvalue decomposition, and singular value decomposition in software on a multithread processor implemented either in a general-purpose computer platform or a CORDIC-extended processor implementation.

Further, both Givens rotations and Householder reflections can be used to vanish matrix elements below a pivot. In either approach, the resulting left matrix is unitary, and both algorithms may be numerically stable. For this reason, Givens rotations and Householder reflections may equally appropriate algorithms. However, the Givens rotation implementation is provided as representative such algorithms' implementation of triangularization on a CORDIC-augmented processor architecture because the Givens rotations can be expanded in terms of CORDIC primitives.

Accordingly, as indicated in Equations 7 and 8, CORDIC is a four-element vector-valued function. Two of the values (coordinate y or angle z, and the iteration counter n) are known to go to zero a priori within specified precision. Consequently, there is not any need to provide them a Write Back register if all the CORDIC iterations are performed by a single instruction. However, if not all the CORDIC iterations can be performed by a single instruction, then the coordinate y or angle z, and the iteration counter n may need to be saved between successive CORDIC instruction calls.

Since an instruction is a scalar function having typically two input arguments and one output result in current RISC, RISC-like, DSP, and DSP-like architectures, defining a CORDIC instruction is not a straightforward task. Even an attempt to pack the four values, x, y, z, i, (n) into a wide register (such that a 'single' value is returned) may fail. Indeed, 61 bits may be required to implement 16-bit rotations with CORDIC, while available multithread processors may only have, e.g., 40-bit wide registers.

Thus, one solution for incorporating a vector-valued operations into the multithread processor architecture is to augment the register file with an auxiliary registers that are called implicitly when the CORDIC instruction is being issued. Specifically, the CORDIC instruction CORDIC Rs1, Rs2, Rt may use the auxiliary register Raux as both argument register and result register. In such an implementation, the arguments may be read in from registers Rs1 (and possibly from Rs2 if additional configuration information is needed), and Raux, and may be written back to Rt and Raux.

To preserve the existing connectivity of functional units to the current register file, the auxiliary register may be part of the CORDIC functional unit rather that of the register file. This auxiliary register may not be used as the argument in the MOVE instruction.

To upload data to the auxiliary register, an additional instruction may be needed. Such an instruction may be, for example, configure CORDIC, or CFG_CORDIC. Since one of the input values of the CORDIC algorithm may be known a priori to go to zero, there may not be a need to move information from the auxiliary register back to the register file. Subsequently, this approach may be referred to as the "FULL-CORDIC" approach to differentiate it from an alternative, when CORDIC operation is split.

Specifically, if the hardware overhead for deploying auxiliary registers is not desired, for example, for cost reasons, then the CORDIC operation may be split into two semi-operations. The first semi-operation may update the couple (x, y), while the second semi-operation may update the couple $(z, i_n)$. This approach may be referred to as the "SEMI-CORDIC" approach. One drawback of the SEMI-CORDIC approach is that two operations may need to be called back-to-back in order to implement a FULL-CORDIC operation. As such, the CORDIC instruction count is double. However, with semi-operations, the CORDIC operations neatly fit in the existing instruction format, fit the existing connectivity structure to the register file, and hence require only a little hardware overhead.

A FULL-CORDIC implementation is also possible by defining so-called "super-operations." In this approach, two adjacent slots in the 4-way SIMD vector may implement a single CORDIC operation. That is, the CORDIC operation may be executed in a two-way SIMD style with double-sized arguments. In such an implentation, defining a super-operation to perform a FULL-CORDIC operation is not faster than SEMI-CORDIC; rather, only half of the data is processed. Although a super-operation approach is as fast as the SEMI-CORDIC approach, it also may require changes in the compiler; as a result, such an implementation may have some deficiencies depending on compiler constraints.

The instructions corresponding to the FULL-CORDIC approach with an auxiliary register, and to the semi-CORDIC approach are now provided.

Figure 5:
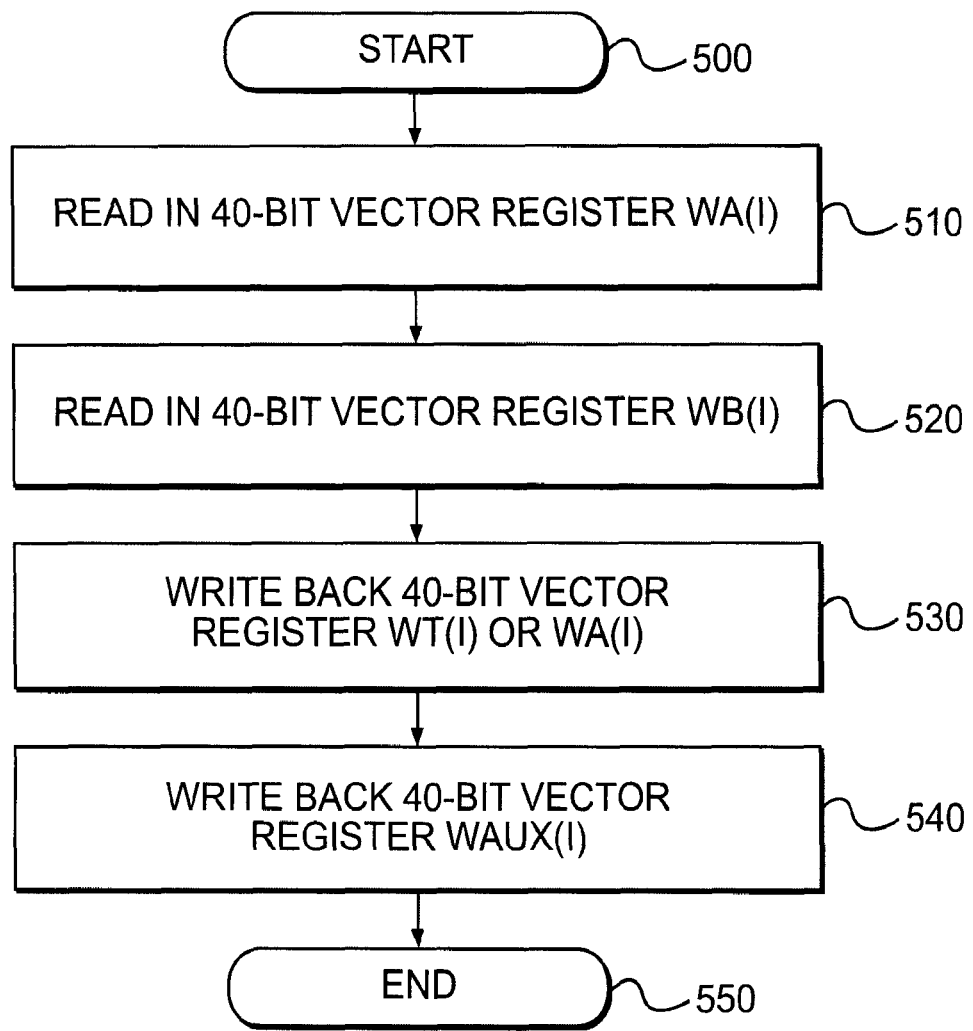
FIGS. 5-7 illustrates three examples of instructions for a FULL-CORDIC approach: configure instruction CFG_CORDIC (FIG. 5), rotate instruction ROT_CORDIC (FIG. 6), and vector instruction VEC_CORDIC (FIG. 7).
Figure 6:
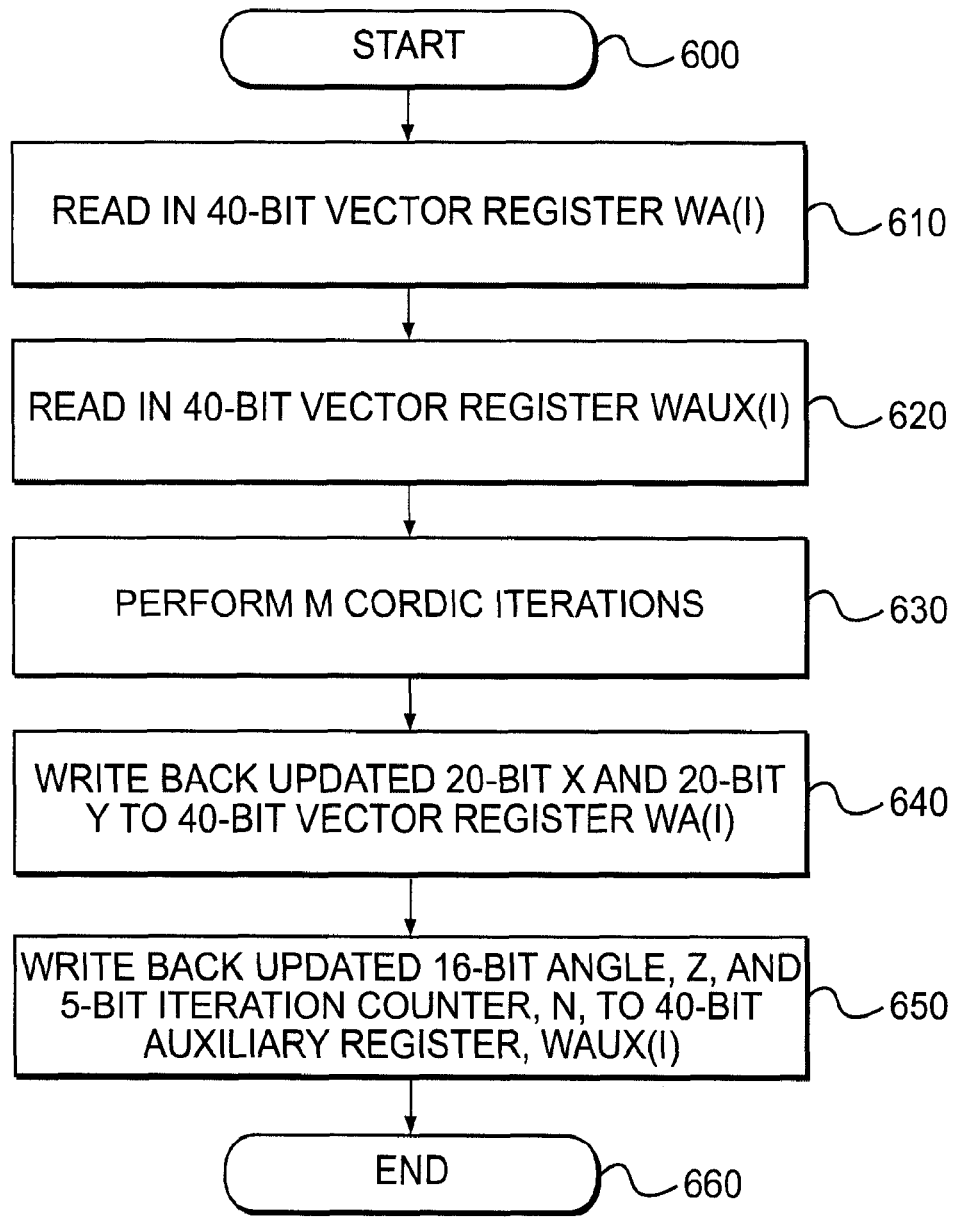
Figure 7:
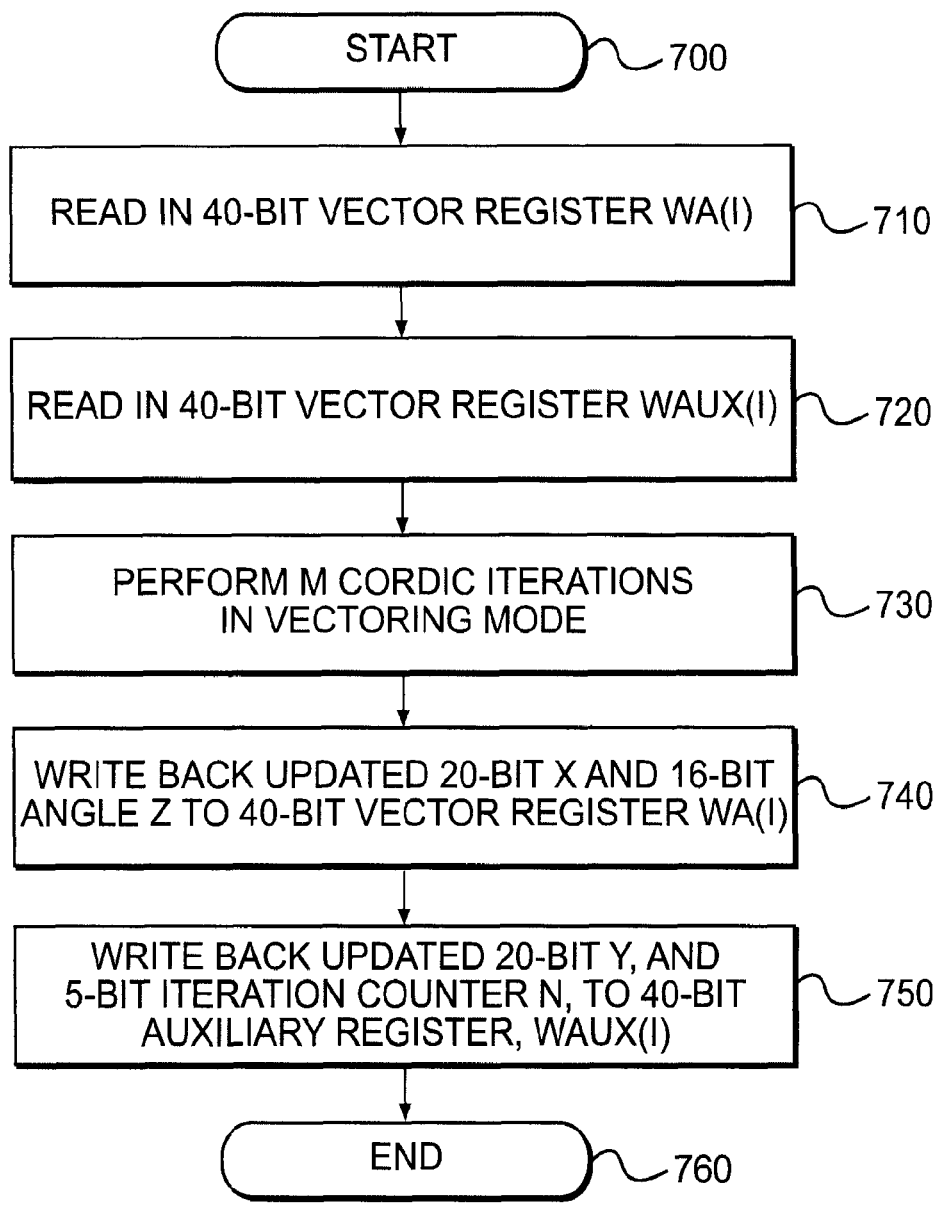

FIGS. 5-7 illustrates three examples of instructions for a FULL-CORDIC approach: configure instruction CFG_CORDIC (FIG. 5), rotate instruction ROT_CORDIC (FIG. 6), and vector instruction VEC_CORDIC (FIG. 7).

As illustrated in FIG. 5, the CFG_CORDIC instructions for (i=0; i<4; i++) begin at 500 and control proceeds to 510, at which the 40-bit vector register WA(i) is read in. The register may contains only 32 bits of significance as follows: 16 bits for x, and 16 bits for y for the rotation mode or z for the vectoring mode. Control then proceeds to 520, at which the 40-bit vector register WB(i) is read in. That register may contain only 21 bits of significance as follows: 16 bits for z for the rotation mode or y for the vectoring mode, and 5 bits for the iteration counter n. Control then proceeds to 530, at which the 40-bit vector register WT(i), or WA(i), is written back, e.g., it may contain the 16-bit x, the 16-bit y or z and the remaining 8 bits that constitute additional internal precision for x and y or z may set to zero. Control then proceeds to 540, at which the 40-bit vector register WAUX(i) that contains the 16-bit z or y and the iteration counter n is written back. Control then proceeds to 550, at which operations end.

Turning to the instructions performed in connection with the rotate instruction ROT_CORDIC for (i=0; i<4; i++) for a FULL-CORDIC approach, operations are illustrated in FIG. 6. As shown in that figure, control begins at 600 and proceeds to 610. At 610, the 40-bit vector register WA(i) is read in. This register may contain the 20-bit x and the 20-bit y. Control then proceeds to 620, at which the 40-bit vector register WAUX(i) may be read in. That register may contain the 16-bit angle, z, and the 5-bit iteration counter n. Control then proceeds to 630, at which M CORDIC iterations may be performed in the rotation mode (e.g., four additions and four shifts) during the four execution pipeline stages. Control then proceeds to 640, at which the updated 20-bit x and the 20-bit y are written back to the 40-bit vector register WA(i). Subsequently, control proceeds to 650, at which the updated 16-bit angle, z, and the 5-bit iteration counter, n, is written back to the 40-bit auxiliary register, WAUX(i). Control then proceeds to 660, at which the operations end.

Turning to the instructions performed in connection with the vector instructions VEC_CORDIC for (i=0; i<4; i++) for a FULL-CORDIC approach, operations are illustrated in FIG. 7. As shown in that figure, control begins at 700 and proceeds to 710. At 710, the 40-bit vector register WA(i) is read in. That register may contains the 20-bit x and the 16-bit angle, z. Control then proceeds to 720, wherein the 40-bit vector register WAUX(i) is read in. That register may contains the 20-bit y, and the 5-bit iteration counter n. Control then proceeds to 730, wherein, M CORDIC iterations are performed in the vectoring mode (e.g., four additions and four shifts) during the four execution pipeline stages. Control then proceeds to 740, at which the updated 20-bit x and the 16-bit angle, z are written back to the 40-bit vector register WA(i). Control then proceeds to 750, wherein the updated 20-bit y, and the 5-bit iteration counter, n, are written back to the 40-bit auxiliary register, WAUX(i). Control then proceeds to 760, at which the operations end.

Figure 9:
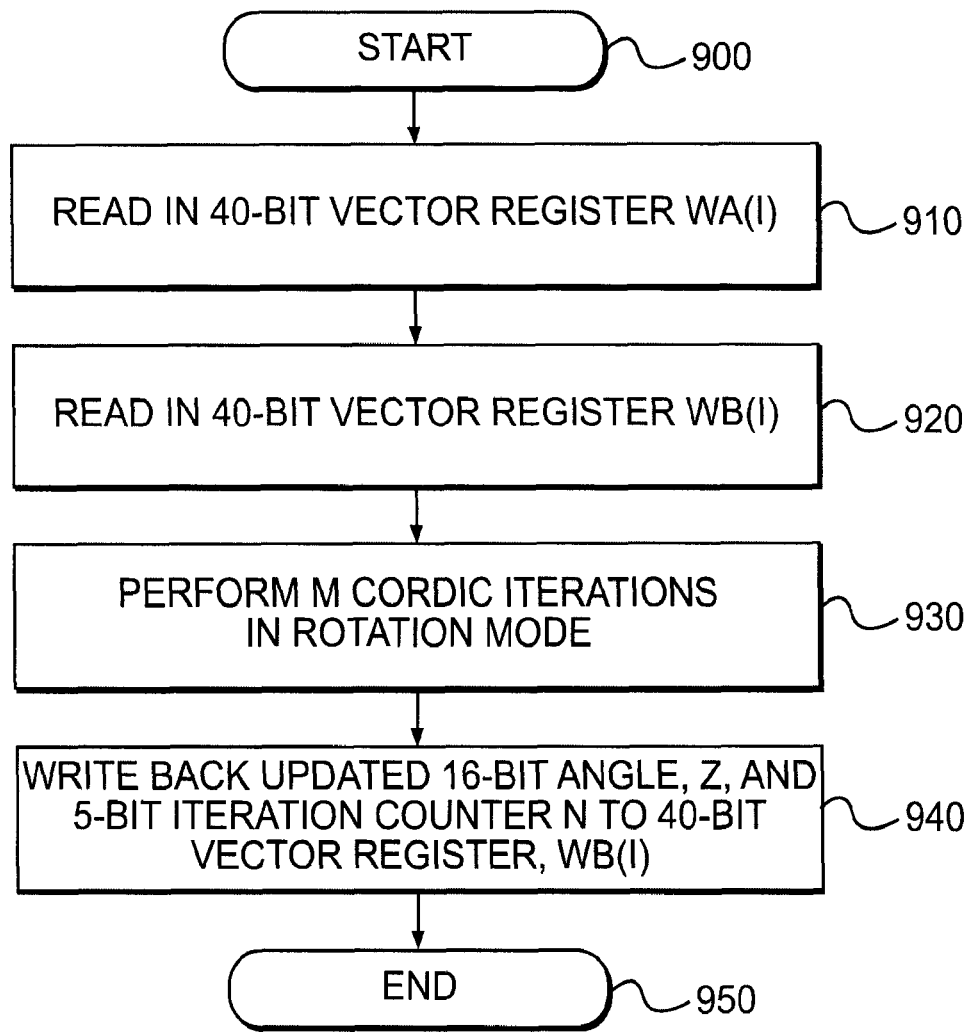
Figure 10:
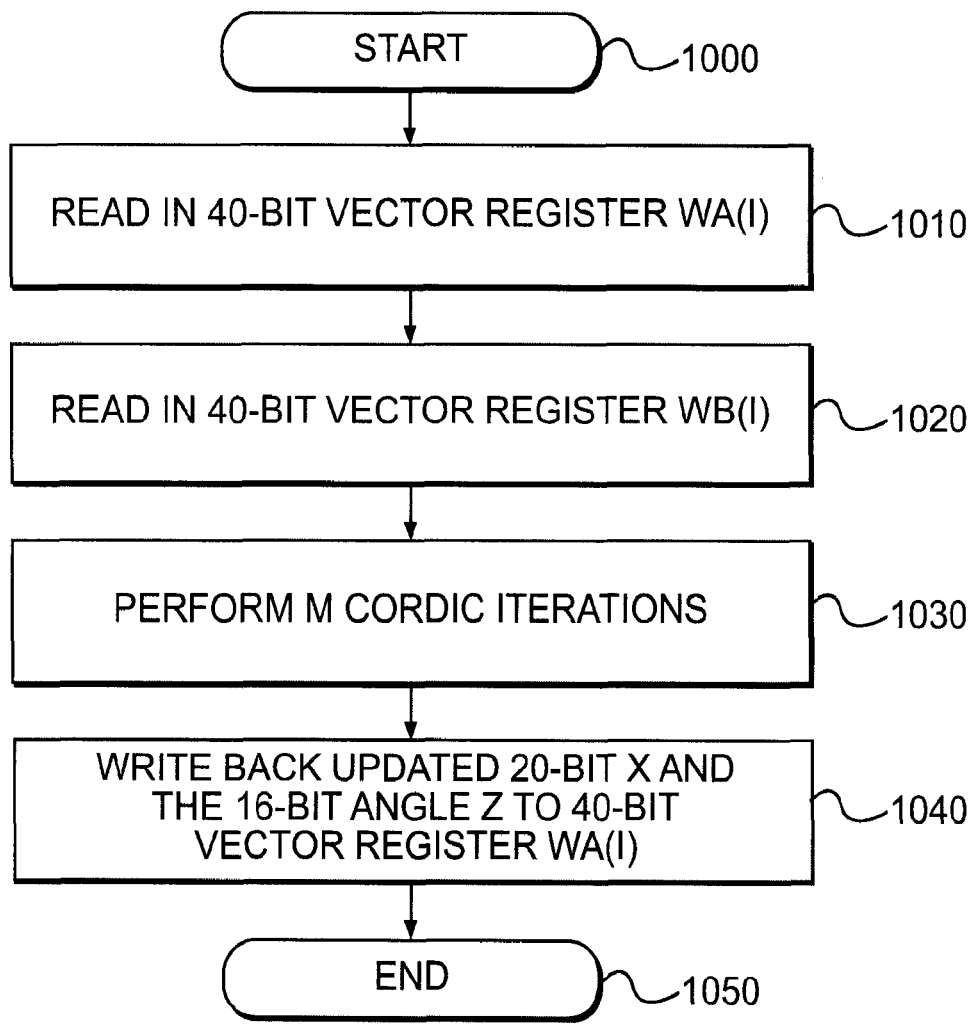
Figure 11:
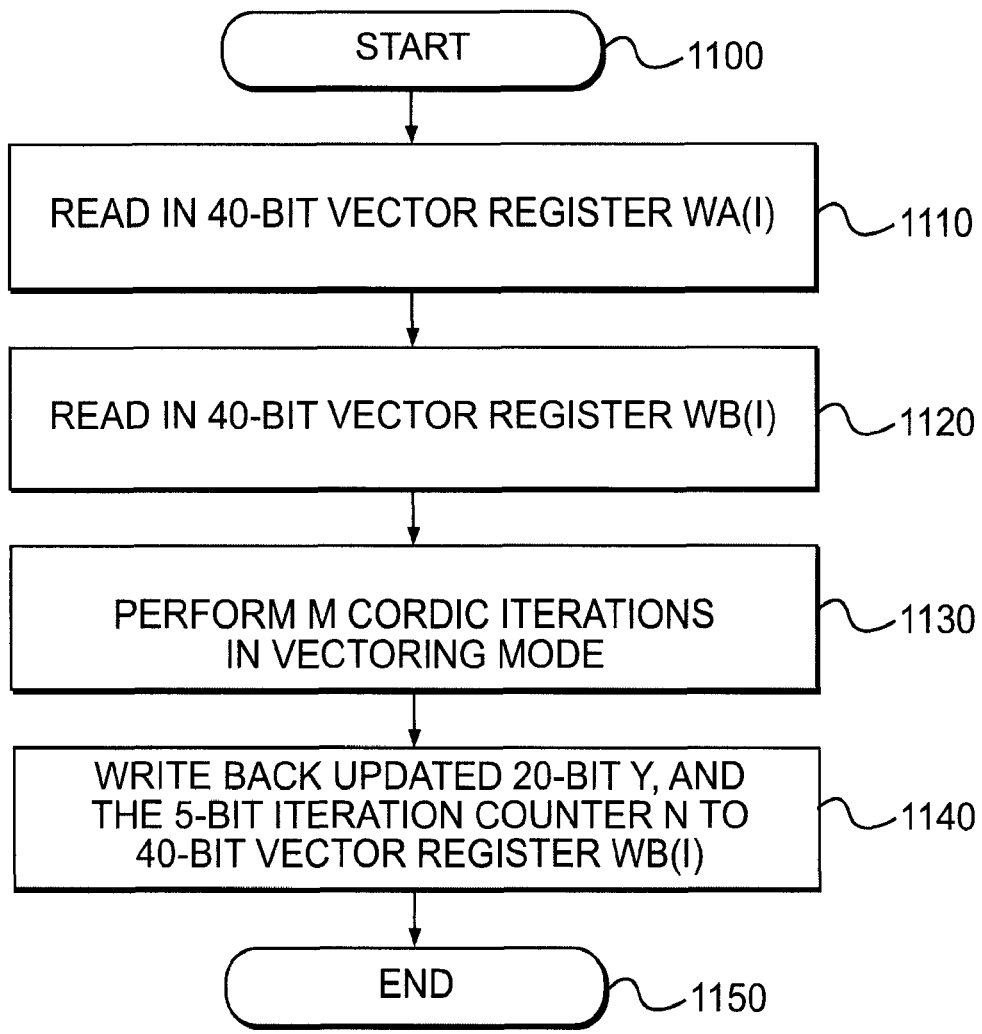

FIGS. 8-11 illustrates four examples of instructions for a SEMI-CORDIC approach: XY rotation instruction XY_ROT_CORDIC (FIG. 8), ZJ rotation instruction ZJ_ROT_CORDIC (FIG. 9), XY vector instruction XY_VEC_CORDIC (FIG. 10), and ZJ vector instruction ZJ_VEC_CORDIC.DIC (FIG. 11).

Figure 8:
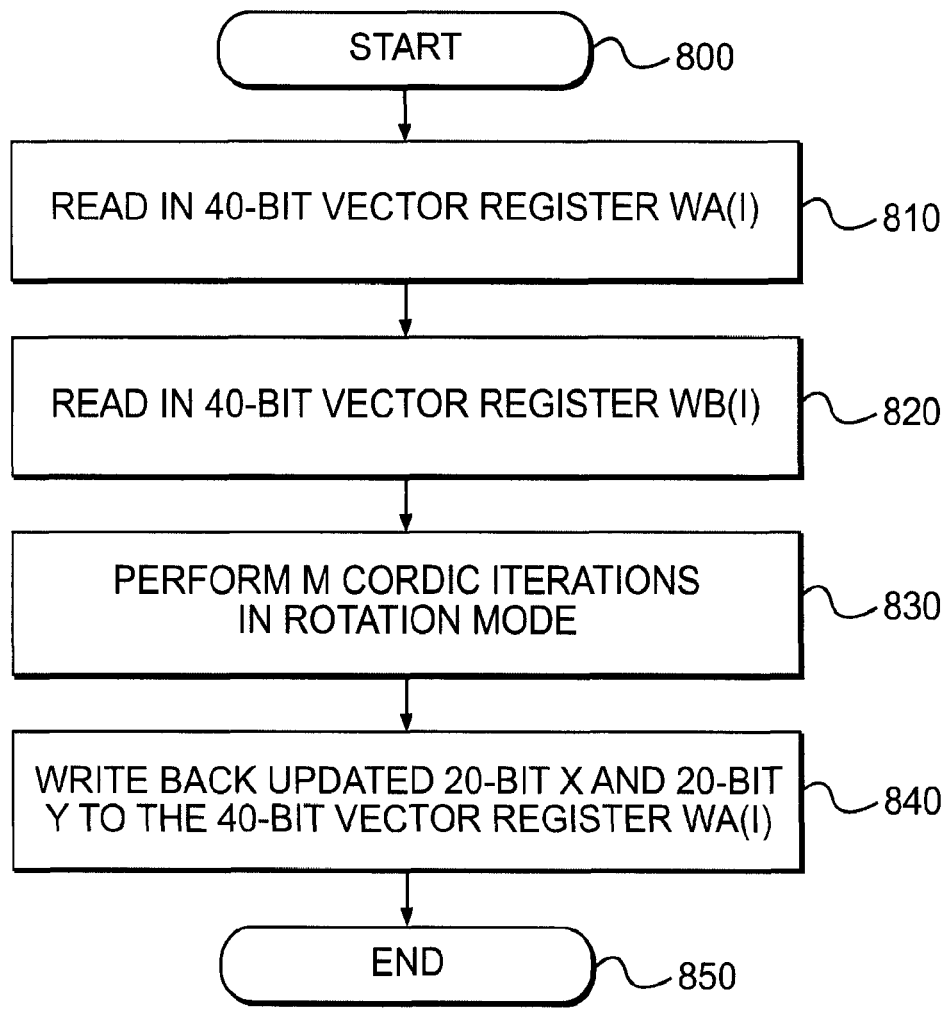
FIGS. 8-11 illustrates four examples of instructions for a SEMI-CORDIC approach: XY rotation instruction XY_ROT_CORDIC (FIG. 8), ZJ rotation instruction ZJ_ROT_CORDIC (FIG. 9), XY vector instruction XY_VEC_CORDIC (FIG. 10), and ZJ vector instruction ZJ_VEC_CORDIC.DIC (FIG. 11).

As illustrated in FIG. 8, the XY rotation instruction set XY_ROT_CORDIC for (i=0; i<4; i++) for a SEMI-CORDIC approach is illustrated. The instruction set begins at 800, and control proceeds to 810, at which the 40-bit vector register WA(i) is read in. That register may contains the 20-bit x and the 20-bit y. Control then proceeds to 820, at which the 40-bit vector register WB(i) is read in. That register may contain the 16-bit angle, z, and the 5-bit iteration counter n. Control then proceeds to 830, at which M CORDIC iterations are performed in the rotation mode (four additions and four shifts) during the four execution pipeline stages. Control then proceeds to 840, at which the updated 20-bit x and the 20-bit y are written back to the 40-bit vector register WA(i). Control then proceeds to 850, at which operations end.

Turning to the operations performed in connection with the vector instructions ZJ_ROT_CORDIC for (i=0; i<4; i++) for a SEMI-CORDIC approach, operations are illustrated in FIG. 9. As shown in that figure, control begins at 900 and proceeds to 910. At 910, the 40-bit vector register WA(i) is read in. That register may contain the 20-bit x and the 20-bit y. Control then proceeds to 920, at which the 40-bit vector register WB(i) that contains the 16-bit angle, z, and the 5-bit iteration counter n are read in. Control then proceeds to 930, at which M CORDIC iterations in the rotation mode (four additions and four shifts) during the four execution pipeline stages. Control then proceeds to 940, at which the updated 16-bit angle, z, and the 5-bit iteration counter, n, are written back to the 40-bit vector register, WB(i). control then proceeds to 950, at which the operations end.

Turning to the operations performed in connection with the vector instructions for XY_VEC_CORDIC for (i=0; i<4; i++) for a SEMI-CORDIC approach, operations are illustrated in FIG. 10. As shown in that figure, control begins at 1000 and control proceeds to 1010 at which the 40-bit vector register WA(i) that contains the 20-bit x and the 16-bit angle z is read in. Control then proceeds to 1020, wherein the 40-bit vector register WB(i) is read in. This register may contain the 20-bit y, and the 5-bit iteration counter, n. Control then proceeds to 1030, at which M CORDIC iterations are performed in the vectoring mode (four additions and four shifts) during the four execution pipeline stages. Control then proceeds to 1040, at which the updated 20-bit x and the 16-bit angle, z are written back to the 40-bit vector register WA(i). Control then proceeds to 1050 at which operations end.

Turning to the operations performed in connection with the vector instruction for ZJ_VEC_CORDIC for (i=0; i<4; i++) for a SEMI-CORDIC approach, operations are illustrated in FIG. 11. As shown in that figure, control begins at 1100 and control proceeds to 1110 at which the 40-bit vector register WA(i) is read in. That register may contain the 20-bit x and the 16-bit angle z. Control proceeds to 1120, at which the 40-bit vector register WB(i) is read in. That register may contains the 20-bit y, and the 5-bit iteration counter n. Control then proceeds to 1130, at which M CORDIC iterations are performed in the vectoring mode (four additions and four shifts) during the four execution pipeline stages. Subsequently, control proceeds to 1140, at which the updated 20-bit y, and the 5-bit iteration counter, n, are written back to the 40-bit vector register WB(i). Control then proceeds to 1150, at which the operations end.

For the rotation mode, the semi-operations may be issued in the order XY_ROT_CORDIC, ZJ_ROT_CORDIC. For the vectoring mode, the semi-operations may be issued in the order ZJ_VEC_CORDIC, XY_VEC_CORDIC.

In a multithread processor architecture, each instruction may have the latency of one thread cycle (eight clock cycles). Since the latency is upper bounded to one thread cycle, the implementation effort may aim to fit into the four execution stages as many CORDIC iterations as possible.

Figure 12:
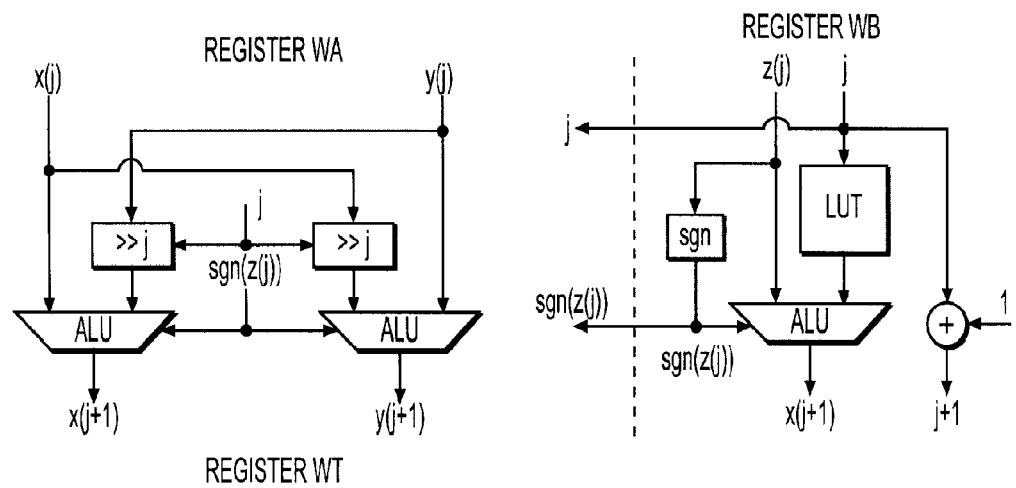
FIG. 12 is a diagram of a CORDIC unit operating on instruction XY_ROT_CORDIC for a rotation mode provided in accordance with at least one embodiment of the invention.
Figure 13:
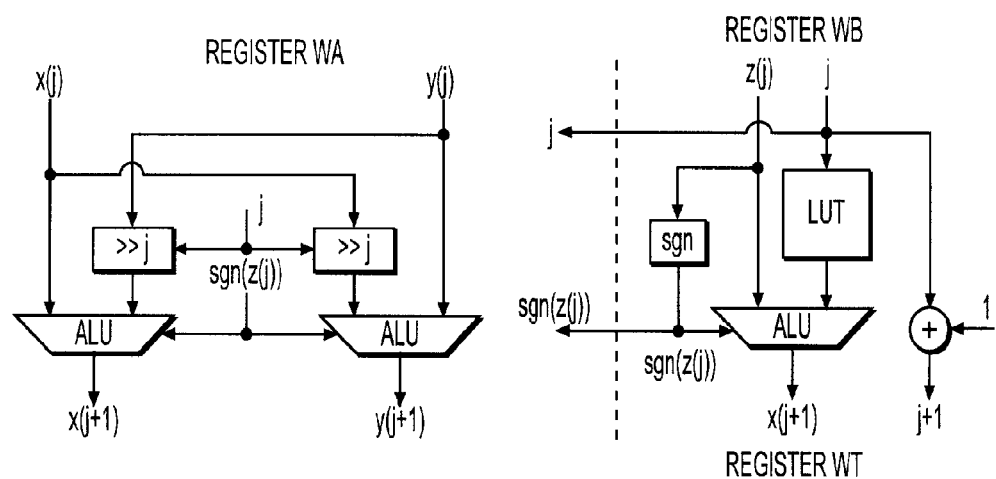
FIG. 13 is a diagram of a CORDIC unit operating on instruction ZJ_ROT_CORDIC for the rotation mode provided in accordance with at least one embodiment of the invention.

The functional unit operating in the circular rotation mode is presented in FIGS. 12 and 13. In these Figures, only the hardware corresponding to a single CORDIC operation is illustrated; however, multiple instances of that circuit can be deployed; thus, multiple CORDIC iterations may be executed per instruction call.

The CORDIC instructions may be called sequentially, e.g., first XY-SCORDIC and then ZJ-SCORDIC. As may be easily observed, both semi-circuits may work in parallel; thus, only the couple X-Y or Z-J may be updated corresponding to the specific semi-instruction being called.

Figure 14:
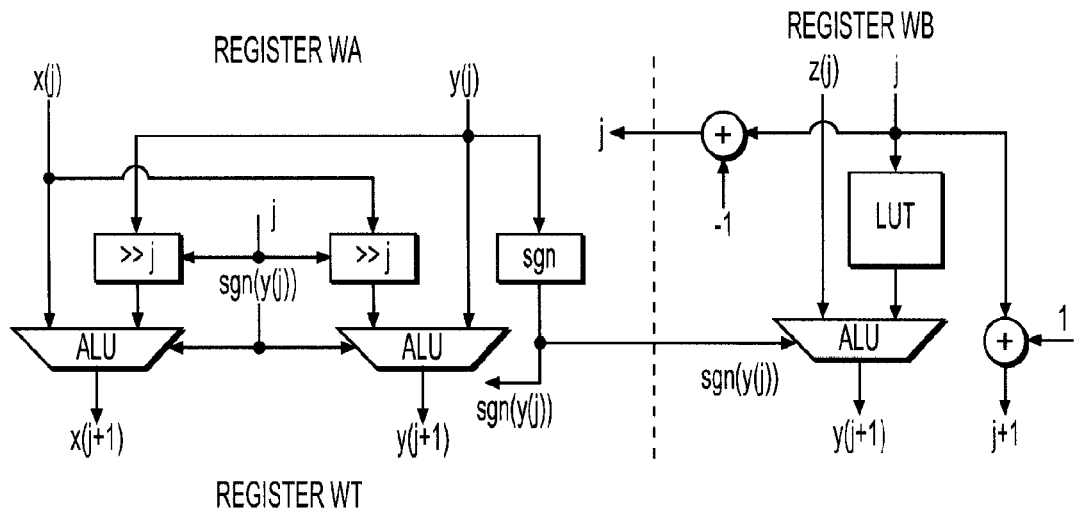
FIG. 14 is a diagram of a CORDIC unit operating on instruction XY_VEC_CORDIC for a vector mode provided in accordance with at least one embodiment of the invention.
Figure 15:
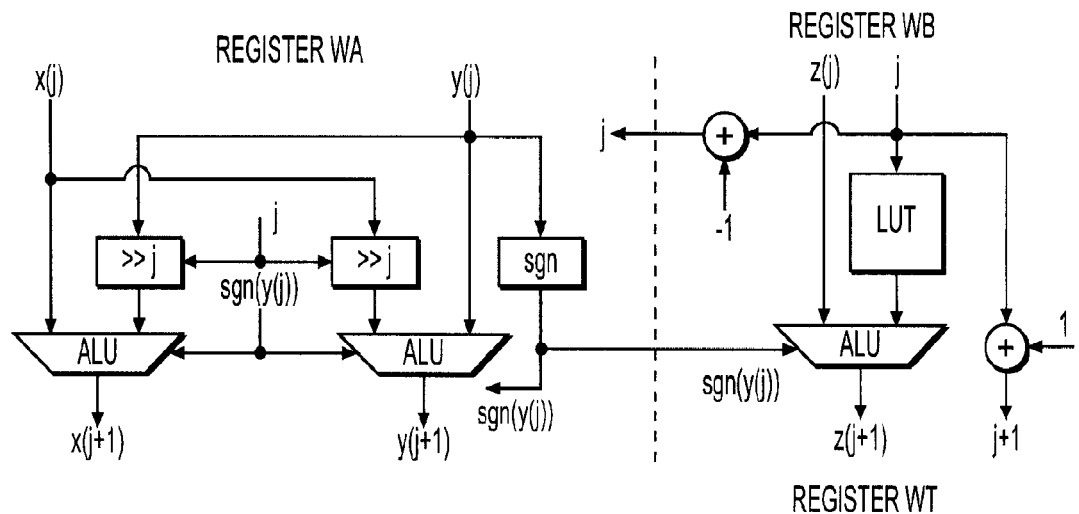
FIG. 15 is a diagram of a CORDIC unit operating on instruction ZJ_VEC_CORDIC for the vector mode provided in accordance with at least one embodiment of the invention.

The functional unit operating in the circular vectoring mode is presented in FIGS. 14 and 15. In these Figures, only the hardware corresponding to a single CORDIC operation is shown. However, multiple instances of that circuit can be deployed; thus, multiple CORDIC iterations may be executed per instruction call.

The CORDIC instructions may be called sequentially, e.g., first ZJ-SCORDIC and then XY-SCORDIC. As may be easily observed, both semi-circuits may be working in parallel; thus, only the couple X-Y or Z-J may be updated corresponding to the specific semi-instruction being called.

The ROT_CORDIC and VEC_CORDIC instructions may be vector instructions that go through eight pipeline stages; that is, the execution itself may have a latency of four clock cycles. The CORDIC functional unit may perform four CORDIC iterations (that include four additions and four shifts) in four pipeline stages. Consequently, either the ROT_CORDIC or VEC_CORDIC instructions may execute four times, i.e., four instruction cycles may be required for a 16-bit precision, and (if a different unit may be deployed per each SIMD slot), will perform four conversions in an SIMD style.

MIMO-OFDM to multiple SISO-OFDM conversion in software may be assumed for four transmitting antennae and four receiving antennae. This configuration is consistent with conventional communication systems. Thus, the computing scenario at the receiver side may be as illustrated in FIG. 16.

Figure 16:
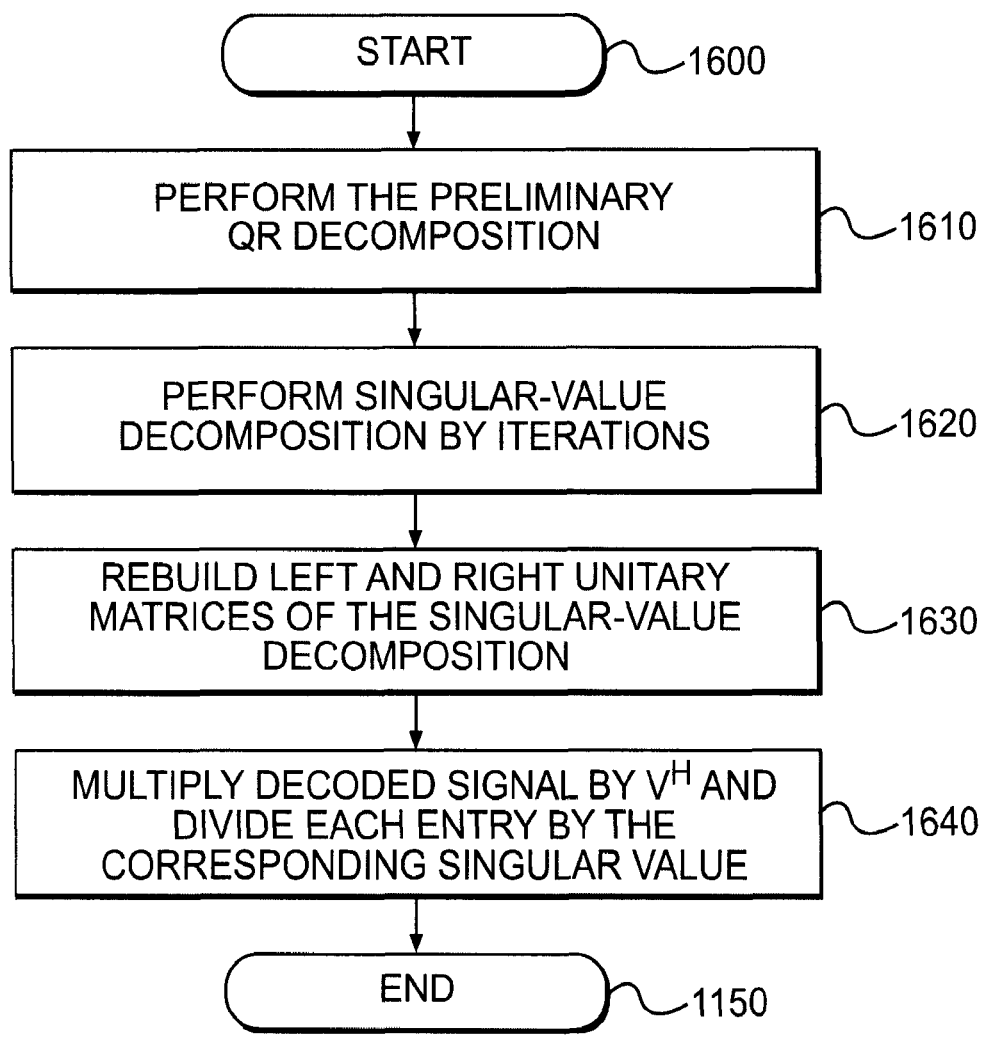
FIG. 16 illustrates an example of computing scenario operations performed at a receiver side in accordance with at least one embodiment of the invention.

As illustrated in FIG. 16, the operations begin at 1600 and control proceeds to 1610, wherein the preliminary QR decomposition is performed to vanish the sub-diagonal elements of the channel matrix, H. For example, a complex Givens rotation may be carried out for each sub-diagonal element of the channel matrix, H. Since the diagonal elements of the upper-triangular matrix, R must be real numbers and the fourth real rotation of the complex rotation need not carried out. Control then proceeds to 1620, at which the singular-value decomposition is performed by iterations (e.g., following the Charlier et al. approach). Control then proceeds to 1630, at which the left and right unitary matrices of the singular-value decomposition, U and V are rebuilt, and control proceeds to 1640. The decoded signal is multiplied by $V^H$ and each entry is divided by the corresponding singular value. Such divisions may be implemented by the CORDIC operating in linear mode. Control then proceeds to 1650, at which computing scenario at the receiver side cease.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

For example, as mentioned previously, in accordance with at least one embodiment of the invention, QR decomposition may be performed using any one of Gram-Schmidt orthogonalization, Givens rotations, and/or Householder reflections. Although the Givens rotations and Householder reflections implementations have been explained above, an alternative implementation using Gram-Schmidt orthogonalization may also be implemented in accordance with at least one embodiment of the invention.

Conventional Gram-Schmidt orthogonalization constructs columns $q_1$ $q_2, \ldots, q_m$ of a unitary matrix Q, and the entries $r_{ij}$ of the triangular matrix R by successive orthogonalization of columns $a_1, a_2, \ldots, a_n$. This is an iterative process, where at each operation, a vector $q_j \epsilon (a_1, \ldots, a_j)$ that is orthonormal to $q_1, \ldots, q_{j-1}$ is found.

However, the Gram-Schmidt algorithm may, in some instances, produce vectors (i.e., columns of matrix Q) that are far from orthogonal when matrix A is close to rank-deficient (See, Kublanovskaya, supra). In addition, the Gram-Schmidt algorithm may rely on division, while a multithread processor may not support division within a standard instruction set. Thus, although division can be emulated with CORDIC operating in the linear mode (See, Sebot et al., supra), precision provided via the Gram-Schmidt implementation may be limited to 16 bits for division by CORDIC emulation (See, Gene H. Golub and Charles F. van Loan, Matrix Computations, *The Johns Hopkins University Press*, 2715 North Charles Street, Baltimore, Md. 21218-4363, 3rd edition, 1996). Such a limitation can cause serious deficiencies for tasks such as matrix triangularization. However, in some instances, the Gram-Schmidt decomposition may be sufficient.

Additionally, it should be understood that the term "multi-thread processor" may include any digital signal processor in a communication device that features SIMD, VLIW, and multi-threading capabilities.

Further, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Moreover, although at least one embodiment has been described that utilizes a CORDIC approach, it should be understood that, when a hardware multiplier is available (e.g., in a Digital Signal Processing microprocessor), table-lookup methods and power series may be faster than CORDIC. Accordingly, it should be appreciated that various other approaches may be utilized in accordance with embodiments of the invention in place of a CORDIC approach.

Although the utility of various invention embodiments has been described in connection with the distribution of promotional content, it should be understood that distributed information is not limited to promotional content but may also or alternatively include non-promotional material.

As a result, it will be apparent for those skilled in the art that the illustrative embodiments described are only examples and that various modifications can be made within the scope of the invention as defined in the appended claims.

What is claimed:

1. A digital signal processor in a wireless communication device, the processor comprising:
    a vector unit, the vector unit including multiple instances of a CORDIC functional unit as execution stages of a processing pipeline, each CORDIC functional unit configured to perform one iteration of a CORDIC algorithm;
    first and second registers coupled to and accessible by the vector unit; and
    an instruction set configured to perform singular value decomposition of a matrix of channel values by coordinate rotation digital computer instructions using the vector unit and the first and second registers, the instruction set including:
        a first instruction that reads x and y coordinate values from the first register, reads angle z and iteration count n values from the second register, performs M iterations of the CORDIC algorithm using the multiple instances of the CORDIC functional unit, and writes updated x and y values from the M iterations to the first register without writing updated z and n values from the M iterations to the second register;
        a second instruction that reads x and y coordinate values from the first register, reads angle z and iteration count n values from the second register, performs M iterations of the CORDIC algorithm using the multiple instances of the CORDIC functional unit, and writes updated z and n values to the second register without writing updated x and y values to the first register.

2. The processor of claim 1, wherein the processor is a single instruction multiple data processor.

3. The processor of claim 1, wherein the instruction set includes instructions that perform a Givens rotation.

4. The processor of claim 1, wherein the processor is a multi-thread, very long word instruction processor and the instructions use the multi-threading.

5. The processor of claim 1, wherein the first and second registers are in a register file.

6. The processor of claim 1, wherein instruction set includes:
    a third instruction that reads x and z values from the first register, reads y and n values from the second register, performs M iterations of the CORDIC algorithm using the multiple instances of the CORDIC functional unit, and writes updated x and z values from the M iterations to the first register without writing updated y and n values from the M iterations to the second register;
    a fourth instruction that reads x and z values from the first register, reads y and n values from the second register, performs M iterations of the CORDIC algorithm using the multiple instances of the CORDIC functional unit, and writes updated y and n values to the second register without writing updated x and z values to the first register.

7. The processor of claim 1, wherein the matrix channel values are multiple-input multiple-output received values to be converted to single-input single-output values for further processing by the instructions.

8. A process for performing singular value decomposition of a matrix of channel values in a wireless communication device, the process comprising:

providing a processor that includes a vector unit, the vector unit including multiple instances of a CORDIC functional unit as execution stages of a processor pipeline, each CORDIC functional unit configured to perform one iteration of a CORDIC algorithm; and the vector unit reading and writing to first and second registers included in the processor;

wherein, the matrix inversion of the matrix of channel values is performed by a coordinate rotation digital computer instruction set using the vector unit and the first and second registers, and the instruction set includes instructions that read the first and second registers, perform a coordinate rotation digital computer process and write results of the process to the first and second registers, wherein the process includes:

calling a first instruction of the instruction set that reads x and y coordinate values from the first register, reads angle z and iteration count n values from the second register, performs M iterations of the CORDIC algorithm using the multiple instances of the CORDIC functional unit, and writes updated and x and y values from the M iterations to the first register without writing updated z and n values from the M iterations to the second register;

calling a second instruction of the instruction set that reads x and y coordinate values from the first register, reads angle z and iteration count n values from the second register, performs M iterations of the CORDIC algorithm using the multiple instances of the CORDIC functional unit, and writes updated z and n values to the second register without writing updated x and y values to the first register.

9. The process of claim 8, further comprising:

calling a third instruction that reads x and z values from the first register, reads y and n values from the second register, performs M iterations of the CORDIC algorithm using the multiple instances of the CORDIC functional unit, and writes updated x and z values from the M iterations to the first register without writing updated y and n values from the M iterations to the second register;

calling a fourth instruction that reads x and z values from the first register, reads y and n values from the second register, performs M iterations of the CORDIC algorithm using the multiple instances of the CORDIC functional unit, and writes updated y and n values to the second register without writing updated x and z values to the first register.

10. The process of claim 8, wherein the instructions include instructions that perform a Givens rotation.

11. A digital signal processor in a wireless communication device, the processor comprising:

means for vector processing comprising a vector unit including multiple instances of a CORDIC functional unit as execution stages of a processing pipeline, each CORDIC functional unit configured to perform one iteration of a CORDIC algorithm;

first and second storage means coupled to and accessible by the means for vector processing; and means for singular value decomposition of a matrix of channel values, the means for singular value decomposition comprising an instruction set including:

a first instruction for reading x and y coordinate values from the first storage means, reading angle z and iteration count n values from the second storage means, performing M iterations of the CORDIC algorithm using the multiple instances of the CORDIC functional unit, and writing updated x and y values from the M iterations to the first storage means without writing updated z and n values from the M iterations to the second storage means; and a second instruction for reading x and y coordinate values from the first storage means, reading angle z and iteration count n values from the second storage means, performing M iterations of the CORDIC algorithm using the multiple instances of the CORDIC functional unit, and writing updated z and n values to the second storage means without writing updated x and y values to the first storage means.

* * * * *